Figure 1:
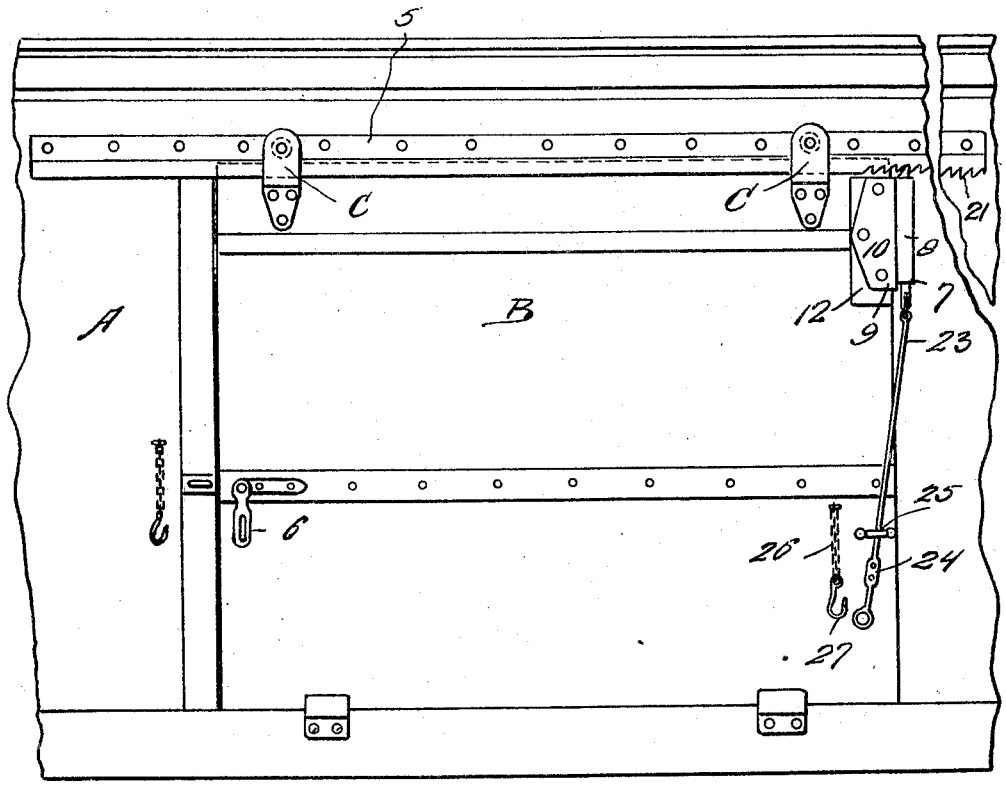

Oct. 13, 1925.  1,557,288
J. E. HUNTER ET AL
AUTOMATIC FREIGHT CAR DOOR LOCKING MECHANISM
Filed March 7, 1925   2 Sheets-Sheet 1

Inventors
J. E. Hunter,
C. H. Lindsay,
By Clarence O'Brien
Attorney

Oct. 13, 1925.
J. E. HUNTER ET AL
1,557,288
AUTOMATIC FREIGHT CAR DOOR LOCKING MECHANISM
Filed March 7, 1925    2 Sheets-Sheet 2
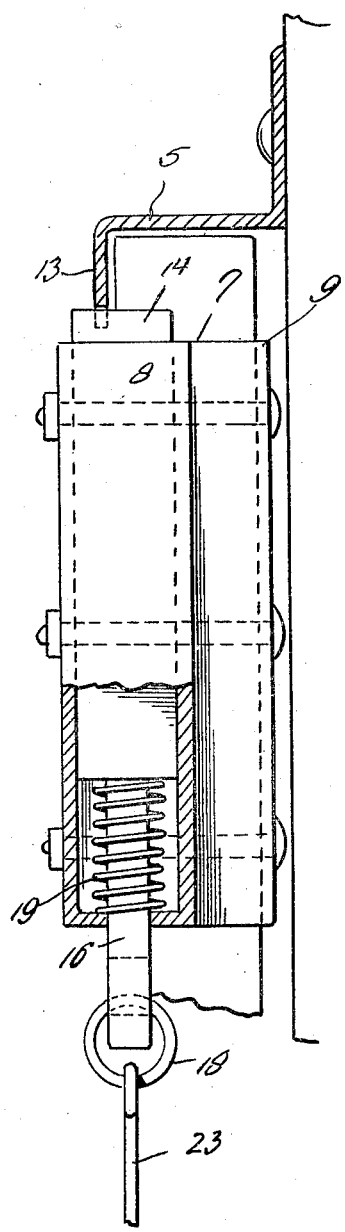
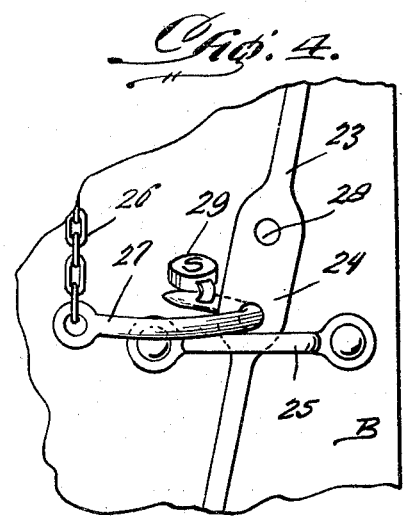
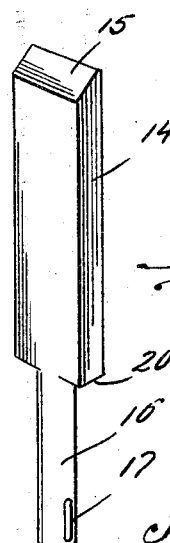
Inventors
J. E. Hunter,
C. H. Lindsay,
By
Attorney Patented Oct. 13, 1925.

1,557,288

UNITED STATES PATENT OFFICE.

JAMES E. HUNTER AND CHRISTIAN H. LINDSAY, OF MONACA, PENNSYLVANIA.

AUTOMATIC FREIGHT-CAR-DOOR-LOCKING MECHANISM.

Application filed March 7, 1925. Serial No. 13,771.

*To all whom it may concern:*

Be it known that we, JAMES E. HUNTER and CHRISTIAN H. LINDSAY, both citizens of the United States, residing at Monaca, in the county of Beaver and State of Pennsylvania, have invented certain new and useful Improvements in an Automatic Freight-Car-Door-Locking Mechanism, of which the following is a specification.

This invention relates to a mechanism for automatically locking the doors of freight cars in a closed position when they are left open.

Almost invariably when a box freight car is emptied, the people emptying the same leave the door open and as the car is shifted about the freight yard and moved about from place to place in its emptied condition, the door slams closed and opened, thereby doing considerable damage to the door, the car, and stocks provided for the door. Other damage is also done by this slamming of the door.

The present invention contemplates the provision of means which will allow the door to close but prevent it from opening so that if it is left open it will eventually move to a complete closed position and be held in this closed position, thereby eliminating all the damage heretofore referred to in the conventional structure now in use.

Another important object of the invention is to provide a mechanism of this nature which may be sealed in a locked position when the freight car is loaded so as to prevent tampering therewith by unauthorized parties.

A still further important object of the invention is to provide a mechanism of this nature which is possessed of an exceedingly simple and efficient structure, one which is thoroughly reliable in operation, easy to manipulate, not liable to readily get out of order, strong, durable, and otherwise well adapted to the purpose for which it is designed.

With the above and numerous other objects in view as will appear as the description proceeds, the invention resides in certain novel features of construction and in the combination and arrangement of parts as will be hereinafter more fully described and claimed.

In the drawings—

Figure 2:
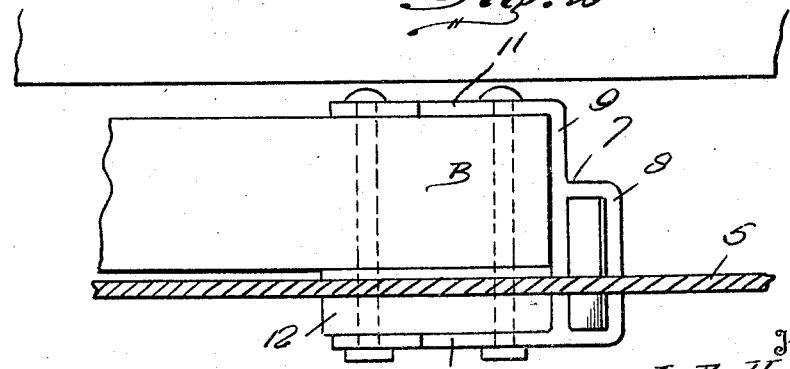

Figure 1 is a fragmentary side elevation of a freight car showing the door without improved locking mechanism associated therewith, Fig. 2 is a fragmentary longitudinal section through the track rail of the freight car for supporting the door showing our improved latch mechanism in top plan, Fig. 3 is a side elevation of the latch mechanism, a portion being broken away as shown in section, Fig. 4 is a detail view showing the means for sealing the mechanism, and Fig. 5 is a detail perspective of the bolt of the latch mechanism.

Referring to the drawing in detail, it will be seen that A designates a freight car having the usual slidably mounted door B. The door B is mounted by means of rollers in brackets C operable on the track 5. The usual hasp 6 is provided for locking the door D in a closed position.

Our improved mechanism includes a latch indicated generally by the numeral 7 and including a housing 8 formed integral with a U-shaped bracket 9 which straddles the end of the door as is indicated to advantage in Fig. 2. The outer side of the U-shaped bracket 9 is thicker as at 10, than the inner side 11 and the latch casing 8 is disposed on the intermediate portion adjacent the side 10. This side 10 is made thicker by the insertion of a block 12 between it and the outer side of the door B. This structure is provided in order that the latch casing 8 may be disposed under the flange 13 which depends from the track 5.

A latch bolt 14 is slidable in the casing 8 and the upper end thereof is beveled as at 15. A stem or shank 16 extends from the lower end thereof and has a slot 17 therein for receiving a ring 18. A spring 19 is disposed about the stem 16 and impinges against the shoulders 20 formed at the lower end of the bolt 14 and against the lower end of the casing 8 so as to normally hold the beveled end 15 projected for engagement with ratchet teeth 21 provided on the flange 13.

From the construction as thus far described, it will be seen that the door B may be closed and the bolt 14 will trip over the teeth 21, but the door cannot be opened until the bolt is withdrawn into the casing 8.

A rod 23 is engaged with the ring 18 and adjacent its end is provided with a flattened portion 24. This rod 23 extends through a guide member 25 mounted on the door. A chain 26 has one end fixed to the door and the other end fixed to a hook 27, which may be inserted through one of the openings 28 provided in the flat portion 24 and a seal 29 may be engaged with the end of this hook after it has been inserted through one of the openings 28 so as to prevent the removal of the hook without breaking the seal.

This hook is used when the rod 23 is pushed upwardly, thereby taking up the slack occasioned by the ring 18 and slot 17 so that the hook will prevent the downward movement of the rod because of its engagement with the upper side of the guide member 25.

From the above description it will be apparent that after the freight car has been unloaded and the door is left in an open position and as the car is moved about in the freight yard and otherwise, that eventually the door will move to a closed position because of the latch mechanism 7. This will prevent the door from being damaged or damaging other parts of the freight car.

It is thought that the construction, operation, and advantages of the invention should now be clearly understood without a more detailed description of the same.

The present embodiment of the invention has been described in detail merely by way of example, and it is to be understood that numerous changes in the details of construction, in the size, in the materials, and in the combination and arrangement of parts may be resorted to without departing from the spirit or scope of the invention as hereinafter claimed or sacrificing any of its advantages.

Having thus described our invention, what we claim as new is:—

1. In combination, a freight car door, a track, said door being slidably mounted on said track, said track provided with a series of ratchet teeth, and a spring pressed latch device engageable with said teeth for allowing the door to be freely closed and preventing it from being normally opened.

2. In combination, a freight car door, a track, said door being slidably mounted on said track, said track provided with a series of ratchet teeth, and a spring pressed latch device engageable with said teeth for allowing the door to be freely closed and preventing it from being normally opened, an operating rod extending from the latch, a guide through which the rod extends, said rod provided with a flattened portion, and means for engaging the flattened portion above the guide for preventing pulling upon the rod for releasing the latch.

3. In combination, a freight car, a door for the freight car, a track, said door being hung slidably from said track, said track provided with a series of ratchet teeth, a latch mechanism including a casing, a bracket of U-shaped formation formed on the casing and straddling one end of the door, a bolt slidable in the casing, a spring pressing the end of the bolt in engagement with the teeth.

4. In combination, a freight car, a door for the freight car, a track, said door being hung slidably from said track, said track provided with a series of ratchet teeth, a latch mechanism including a casing, a bracket of U-shaped formation formed on the casing and straddling one end of the door, a bolt slidable in the casing, a spring pressing the end of the bolt in engagement with the teeth, a rod engaged with the bolt so that it may be pulled to disengage the bolt from the teeth so that the door may be opened.

5. In combination, a freight car, a door for the freight car, a track, said door being hung slidably from said track, said track provided with a series of ratchet teeth, a latch mechanism including a casing, a bracket of U-shaped formation formed on the casing and straddling one end of the door, a bolt slidable in the casing, a spring pressing the end of the bolt in engagement with the teeth, a rod engaged with the bolt so that it may be pulled to disengage the bolt from the teeth so that the door may be opened, a guide on the door for receiving the rod, said rod provided with a flattened portion having openings, a hook, a chain for mounting the hook on the door, said hook adapted to pierce the openings in the flattened portion of the rod and rest on the guide so as to prevent operation of the rod for pulling the bolt so that the bolt may not be released from the teeth of the track.

In testimony whereof we affix our signatures.

JAMES E. HUNTER.
C. H. LINDSAY.